United States Patent
Kikuchi

(10) Patent No.: US 8,526,806 B2
(45) Date of Patent: Sep. 3, 2013

(54) IMAGING APPARATUS AND IMAGING SYSTEM

(75) Inventor: Masahito Kikuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/435,088

(22) Filed: Mar. 30, 2012

(65) Prior Publication Data

US 2012/0257882 A1    Oct. 11, 2012

(30) Foreign Application Priority Data

Apr. 8, 2011    (JP) .................................. 2011-086281

(51) Int. Cl.
*G03B 13/22*    (2006.01)
(52) U.S. Cl.
USPC .......................................................... 396/91
(58) Field of Classification Search
USPC .......................................................... 396/91
See application file for complete search history.

(56) References Cited

U.S. PATENT DOCUMENTS

| | | | | |
|---|---|---|---|---|
| 4,558,367 A | * | 12/1985 | Urata et al. | 348/350 |
| 4,570,185 A | * | 2/1986 | Arai et al. | 348/345 |
| 4,924,317 A | * | 5/1990 | Hirao et al. | 348/351 |
| 5,101,278 A | * | 3/1992 | Itsumi et al. | 348/357 |
| 5,148,209 A | * | 9/1992 | Subbarao | 396/93 |
| 5,398,064 A | * | 3/1995 | Saka | 348/347 |
| 5,630,180 A | * | 5/1997 | Kusaka | 396/63 |
| 2011/0164865 A1 | * | 7/2011 | Hamada et al. | 396/91 |
| 2012/0163786 A1 | * | 6/2012 | Murashima et al. | 396/91 |

FOREIGN PATENT DOCUMENTS

JP    2007-243934    9/2007

* cited by examiner

*Primary Examiner* — Rodney Fuller
(74) *Attorney, Agent, or Firm* — Frommer Lawrence & Haug LLP; William S. Frommer; Ellen Marcie Emas

(57) ABSTRACT

An imaging apparatus includes an imaging element, a communication unit, an automatic adjustment mechanism and a camera controller. The communication unit receives lens-side information from a lens apparatus. The automatic adjustment mechanism adjusts a position of the imaging element. The camera controller controls the position of the imaging element, which is adjusted by the automatic adjustment mechanism according to a spherical aberration variation, based on the lens-side information.

7 Claims, 3 Drawing Sheets

IMAGING APPARATUS AND IMAGING SYSTEM

BACKGROUND

The present disclosure relates to an imaging apparatus and an imaging system.

Recently, in a widespread single-lens reflex type digital camera, a kind of filter such as a quartz lowpass filter and a glass ND (Neutral Density) filter is interposed in a contact portion between a lens apparatus and a camera body. That is, for the digital camera, a glass substance having a thickness of about 3 mm to about 4 mm is inserted in the contact portion between the lens apparatus and the camera body.

On the other hand, for a film camera, no substance, namely, air, is interposed in the contact portion between the lens apparatus and the camera body. It is believed that the contact portion between the lens apparatus and the camera body has the thickness of 0. Thus, the film camera differs largely from the digital camera.

Generally, many lens apparatuses used in a movie camera are designed for the film camera. In the lens apparatus for the film camera, an aberration is corrected such that the camera is brought into focus in the condition that the glass filter is not inserted in the camera.

On the other hand, recently, a digital movie camera is becoming widespread. In these situations, frequently, the lens apparatus for the film camera is mounted on the digital movie camera in which the filter is inserted. In this case, a spherical aberration varies according to the filters incorporated in the camera. As a result, the best image is obtained in a position different from an original focus position of the lens, and the focus position is deviated.

As to the spherical aberration variation caused by the filter incorporated in the camera, it is conceivable that the focus position is corrected by an amount corresponding to the varied aberration using an AF (Auto Focus) system (for example, see Japanese Patent Publication Laid-Open No. 2007-243934).

SUMMARY

However, a special camera such as the movie camera, few persons bring the camera into focus by viewing a finder. Usually, a distance from the camera to a subject is measured with a tape measure and the like, and the focus position is manually adjusted by setting a distance scale of the lens. In the movie camera that does not have the AF function, it is difficult that the deviation of the focus position caused by the spherical aberration variation is automatically corrected when the lens apparatus designed for the film camera is used in the digital camera (digital movie camera).

Therefore, the disclosure proposes novel, improved imaging apparatus and imaging system which can correct the spherical aberration variation using lens-side information.

According to the present disclosure, there is provided an imaging apparatus including an imaging element, a communication unit that receives lens-side information from a lens apparatus, an automatic adjustment mechanism that adjusts a position of the imaging element, and a camera controller that controls the position of the imaging element, which is adjusted by the automatic adjustment mechanism according to a spherical aberration variation, based on the lens-side information.

Further, according to the present disclosure, there is provided an imaging system including a lens apparatus that includes a lens group, and an imaging apparatus that is detachably attached to the lens apparatus. The lens apparatus includes a communication unit that transmits lens-side information, and the imaging apparatus includes an imaging element, a communication unit that receives the lens-side information, an automatic adjustment mechanism that adjusts a position of the imaging element, and a camera controller that controls the position of the imaging element, which is adjusted by the automatic adjustment mechanism according to a spherical aberration variation, based on the lens-side information.

According to the embodiments of the present disclosure described above, the imaging apparatus and the imaging system, which correct the spherical aberration variation using the lens-side information, can be proposed.

DETAILED DESCRIPTION OF THE EMBODIMENT

Figure 1:
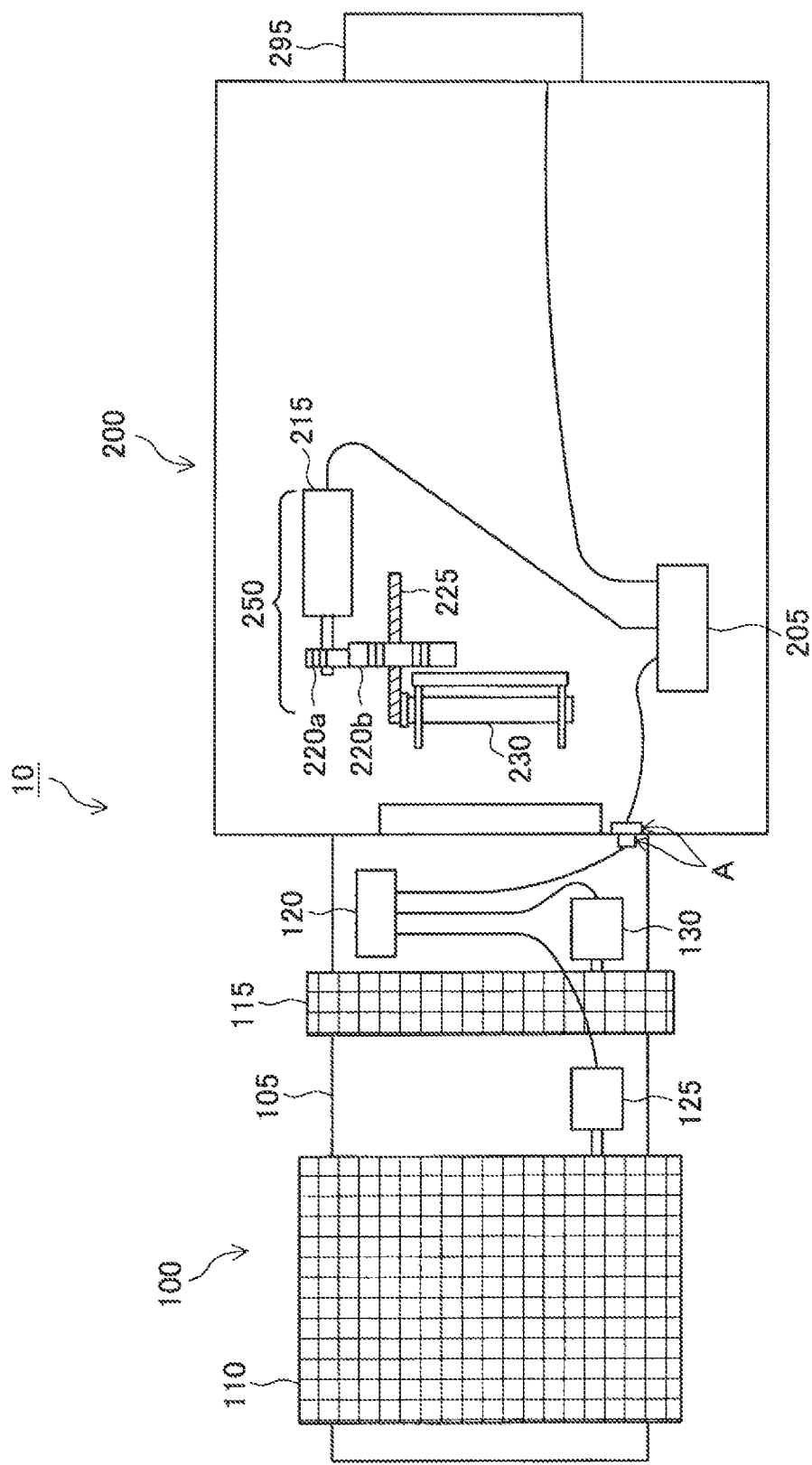
FIG. 1 is a schematic configuration diagram of hardware of an imaging system according to an embodiment of the disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description is made in the following order.
1. Hardware configuration of imaging system
  1.1. Lens apparatus
  1.2. Imaging apparatus
2. Internal configuration diagram of imaging system
  2.1. Lens apparatus
  2.2. Imaging apparatus
3. Automatic correction to spherical aberration variation
  3.1. Flange-focal distance adjustment to lens-side spherical aberration variation
  (Calculation of travel distance of imaging element)
  3.2. Flange-focal distance adjustment to spherical aberration variation caused by lens group extension
  3.3. Flange-focal distance adjustment to spherical aberration variation caused by component in apparatus
  3.4. Flange-focal distance adjustment to spherical aberration variation caused by temperature change <1. Hardware Configuration of Imaging System>

A hardware configuration of an imaging system according to an embodiment of the disclosure will schematically be described with reference to FIG. 1. An imaging system 10 includes a lens apparatus 100 and an imaging apparatus 200. In FIG. 1, the hardware configuration necessary for the description of the imaging system 10 of the embodiment is schematically illustrated while an illustration of other pieces of hardware is omitted.

[1.1. Lens Apparatus]

A hardware configuration of the lens apparatus 100 will be described. The lens apparatus 100 includes a chassis 105 in which, an optical system, such as plural lenses and a diaphragm, is incorporated. The chassis 105 is a cylindrical member, and a focusing ring 110 and a diaphragm ring 115 are mounted on an outer circumference of the chassis 105. The focusing ring 110 is rotated by a manipulation of a photographer, thereby bringing the image system 10 into focus. The diaphragm ring 115 is rotated by the manipulation of the photographer, thereby setting a diaphragm value. An in-lens microcomputer (microprocessor) 120 (corresponding to a lens controller in FIG. 2) of the chassis 105 automatically controls a whole operation of the lens apparatus 100. The in-lens microcomputer 120 is connected to a focusing encoder 125 and a diaphragm encoder 130. The focusing encoder 125 monitors the rotation of the focusing ring 110, and outputs a monitoring result to the in-lens microcomputer 120. The diaphragm encoder 130 monitors the rotation of the diaphragm ring 115, and outputs a monitoring result to the in-lens microcomputer 120.

The in-lens microcomputer 120 is connected to an in-camera microcomputer 205 incorporated in an imaging apparatus 200 through communication contacts A of the lens apparatus 100 and imaging apparatus 200. Therefore, the lens apparatus 100 and the imaging apparatus 200 can transmit and receive information to and from each other.

[1.2. Imaging Apparatus]

A hardware configuration of the imaging apparatus 200 will be described below. The imaging apparatus 200 includes the in-camera microcomputer 205, an imaging element 230, and a flange-focal distance adjusting mechanism 250. The in-camera microcomputer 205 is connected to a power supply 295, and supplied an electric power from the power supply 295. The in-camera microcomputer 205 automatically controls a whole operation of the imaging apparatus 200. The imaging element 230 includes plural light receiving elements for shooting an image. The imaging element 230 is constructed by a CMOS (Complementary Metal Oxide Semiconductor) sensor, a CCD (Charge Coupled Device) or the like.

The in-camera microcomputer 205 controls the flange-focal distance adjusting mechanism 250. The flange-focal distance adjusting mechanism 250 has a function of adjusting a position of the imaging element 230 in an optical axis direction as a variation in distance from a flange surface to a focal point according to a spherical aberration variation. Therefore, a deviation of a focus position can be corrected to shoot a sharp image of a subject. For example, when the imaging element 230 is adjusted so as to be moved backward as the diaphragm is opened, the deviation of the focus position can be corrected to shoot the sharp image of the subject. For the movie camera, it is necessary to adjust the deviation of the focus position with a high accuracy on the order of $10^{-6}$ (several micrometers).

The flange-focal distance adjusting mechanism 250 includes a flange-focal distance adjusting motor 215, gears 220a and 220b, and a screw 225. When the in-camera microcomputer 205 transmits a control signal to the flange-focal distance adjusting motor 215, the flange-focal distance adjusting motor 215 drives to rotate the gears 220a and 220b. Rotation movements of the gears 220a and 220b are converted into a translatory movement of the screw 225, whereby the imaging element 230 moves in the optical axis direction by a desired distance. Therefore, a flange-focal distance is adjusted to correct the deviation of the focus position.

<2. Internal Configuration Diagram of Imaging System>

Figure 2:
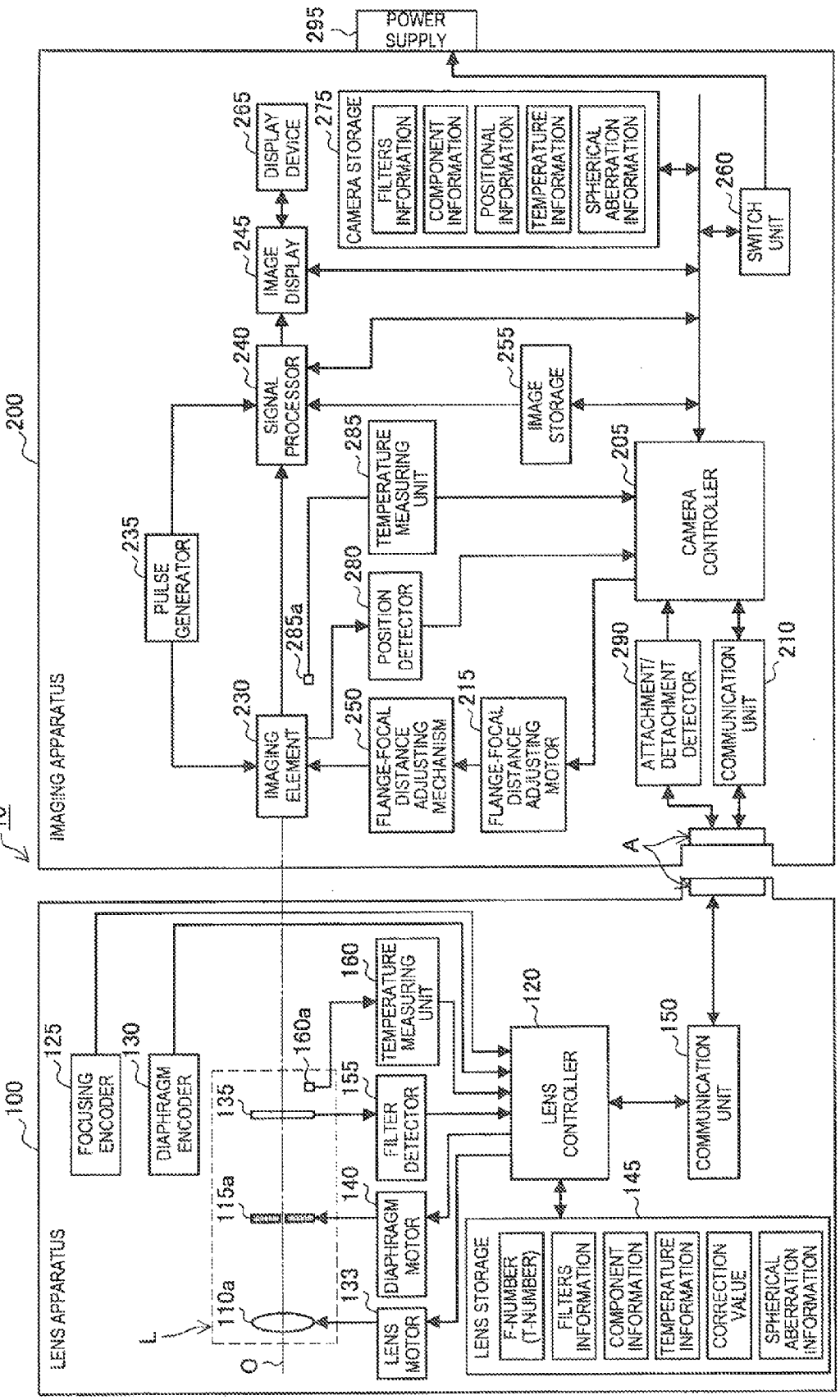
FIG. 2 is an internal configuration diagram of an imaging system according to an embodiment.

Then internal configurations of the lens apparatus 100 and the imaging apparatus 200 according to an embodiment of the present technology will be described with reference to FIG. 2.

[2.1. Lens Apparatus]

The internal configuration of the lens apparatus 100 will be described. As illustrated on the left side in FIG. 2, the lens apparatus 100 includes an optical system L, the lens controller 120, the focusing encoder 125, the diaphragm encoder 130, a lens motor 133, a diaphragm motor 140, a lens storage 145, a communication unit 150, a filter detector 155, and a temperature measuring unit 160.

The optical system L includes a lens group 110a, a diaphragm 5a, and a filter 135, and is disposed on an optical axis O. The lens group 110a is movable in the optical axis direction. Although the lens group 110a is illustrated as one lens in FIG. 2, actually, the lens group 110a includes plural lenses such as a focus lens and a zoom lens. The diaphragm 115a is narrowed according to a diaphragm value. For example, the filter 135 is a quartz lowpass filter or a glass ND filter, and the filter 135 is mounted in an exchangeable manner.

The lens controller 120 is a microprocessor that acts as a control device, and the lens controller 120 controls the whole operation of the lens apparatus 100. For example, the lens controller 120 outputs a driving signal to the lens motor 133 to move the lens group 110a backward and forward. Therefore, the controller 120 can control zooming of the lens or the like by extending the lens. The lens controller 120 outputs the driving signal to the diaphragm motor 140 to control the diaphragm 115a according to subject luminance during a shooting operation.

As described above, the focusing encoder 125 and the diaphragm encoder 130 monitor the states of the lens group 110a and diaphragm 115a, and output the monitoring results to the lens controller 120. The filter detector 155 detects filters mounted on the optical system L.

The temperature measuring unit 160 measures a temperature at the optical system L based on a detection value by a temperature sensor 160a attached to the optical system L. The temperature sensor 160a may be attached to any position as long as the temperature sensor 160a can measure the temperature at the lens apparatus 100.

Various pieces of information on the lens apparatus are stored in the lens storage 145. Examples of the information stored in the lens storage 145 include an F-number (or T-number), filters information, merchandise information in the lens, temperature information, various correction values, and spherical aberration information. These values are updated to latest pieces of information as necessary according to the movement of the lens group, the diaphragm control, a filter exchange, a temperature change, a component exchange in the lens and the like.

The lens controller 120 conducts communication with the communication unit 150 on the side of the lens apparatus 100 and a camera controller 205 in the imaging apparatus 200 through a communication unit 210 on the side of the imaging apparatus 200 later described. For example, the lens controller 120 transmits various pieces of lens-side information stored in the lens storage 145 to the camera controller 205 through the communication unit 150 and the communication unit 210.

[2.2. Imaging Apparatus]

The internal configuration of the imaging apparatus 200 will be described. As illustrated on the right side in FIG. 2, the imaging apparatus 200 includes the camera controller 205, the communication unit 210, the imaging element 230, a pulse generator 235, a signal processor 240, an image display 245, the flange-focal distance adjusting mechanism 250, the flange-focal distance adjusting motor 215, an image storage 255, a switch unit 260, a display device 265, a camera storage 275, a position detector 280, a temperature measuring unit 285, an attachment/detachment detector 290, and the power supply 295.

When the imaging apparatus 10 is in a non-shooting state, light flux passing through the lens group 110a and diaphragm 115a of the lens apparatus 100 travels toward the imaging element 230. During exposure, each pixel of the imaging element 230 performs photoelectric conversion to a subject optical image formed by the lens apparatus 100 according to a light quantity, and accumulates an obtained charge. The accumulated charge is transmitted to the signal processor 240. The signal processor 240 generates image data, and displays the image data on the display device 265 through the image display 245. Therefore, the photographer can observe a subject image through the display device 265.

When the non-shooting state transitions to a shooting state, the pulse generator 235 supplies a scanning clock (horizontal driving pulse) and a predetermined control pulse to the imaging element 230. The pulse generator 235 also outputs a clock signal to the signal processor 240.

The signal processor 240 generates the image data by performing double correlated sampling processing (CDS), gain (AG) processing, and predetermined processing (such as color processing and gamma correction) to the signal read from the imaging element 230. The generated image data is recorded in the image storage 255 while displayed as the shooting image on the display device 265.

The switch unit 260 includes a switch that controls turn-on/turn-off of the power supply 295, a switch that is manipulated to set the shooting condition and the like, and a switch that is manipulated to start a shooting preparation operation and the shooting operation.

The communication unit 210 receives lens-side information from the lens apparatus 100. The lens-side information may include at least one of information on the F-number, the T-number, and the in-lens filter and spherical aberration information. The lens-side information may include information (spherical aberration information) on the spherical aberration variation caused by the extension of the lens group 110a. The lens-side information may include temperature information detected by the temperature sensor 160a attached to the lens apparatus 100, various correction values, and component information in the lens.

The camera controller 205 is a microprocessor that acts as an arithmetic processing unit and a control device, and the camera controller 205 control the whole operation of the imaging apparatus according to various programs. For example, as described above, the camera controller 205 controls the flange-focal distance adjustment. That is, the camera controller 205 outputs the driving signal to the flange-focal distance adjusting motor 215 to operate the flange-focal distance adjusting mechanism 250.

Using the lens-side information, the flange-focal distance adjusting mechanism 250 controls the position of the imaging element 230 with respect to the spherical aberration variation. The flange-focal distance adjusting mechanism 250 includes a mechanism that determines an absolute position in an air conversion optical path length from the flange surface to an imaging surface at a reference temperature or a mechanism that can measure a relative position so as to be able to determine a travel distance from a reference plane. Therefore, the imaging element 230 can be moved backward and forward by a distance corresponding to an amount of spherical aberration variation, and the deviation of the focus position can be corrected. The flange-focal distance adjusting mechanism 250 is an example of the automatic adjustment mechanism that automatically corrects the position of the imaging element 230 using the lens-side information with respect to the spherical aberration variation.

A detection value detected by each unit of the imaging apparatus 200 and a measured value measured by each unit of the imaging apparatus 200 are stored in the camera storage 275. Examples of the information stored in the camera storage 275 include the filters information, the merchandise information, the positional information, the temperature information, and the spherical aberration information. The information on the F-number, and the like, which is received from the lens side, may be stored in the camera storage 275. These values are updated to latest pieces of information as necessary according to a timing for receiving the information from the lens side, the temperature change in the imaging apparatus 200, the component exchange, and the like.

The position detector 280 detects the position of the imaging element. The temperature measuring unit 285 measures the temperature in the imaging apparatus 200 based on the detection value of a temperature sensor 285a attached inside the imaging apparatus 200. The temperature sensor 285a may be attached to any position as long as the temperature sensor 285a can measure the temperature at the imaging apparatus 200. The attachment/detachment detector 290 detects attachment/detachment of the lens apparatus 100, and notifies the camera controller 205 of the detection result.

<3. Automatic Correction to Spherical Aberration Variation>

A flange-focal distance adjustment that automatically corrects the position of the imaging element 230 using the lens-side information with respect to the spherical aberration variation will be described.

[3.1. Flange-Focal Distance Adjustment to Lens-Side Spherical Aberration Variation]

Figure 3:
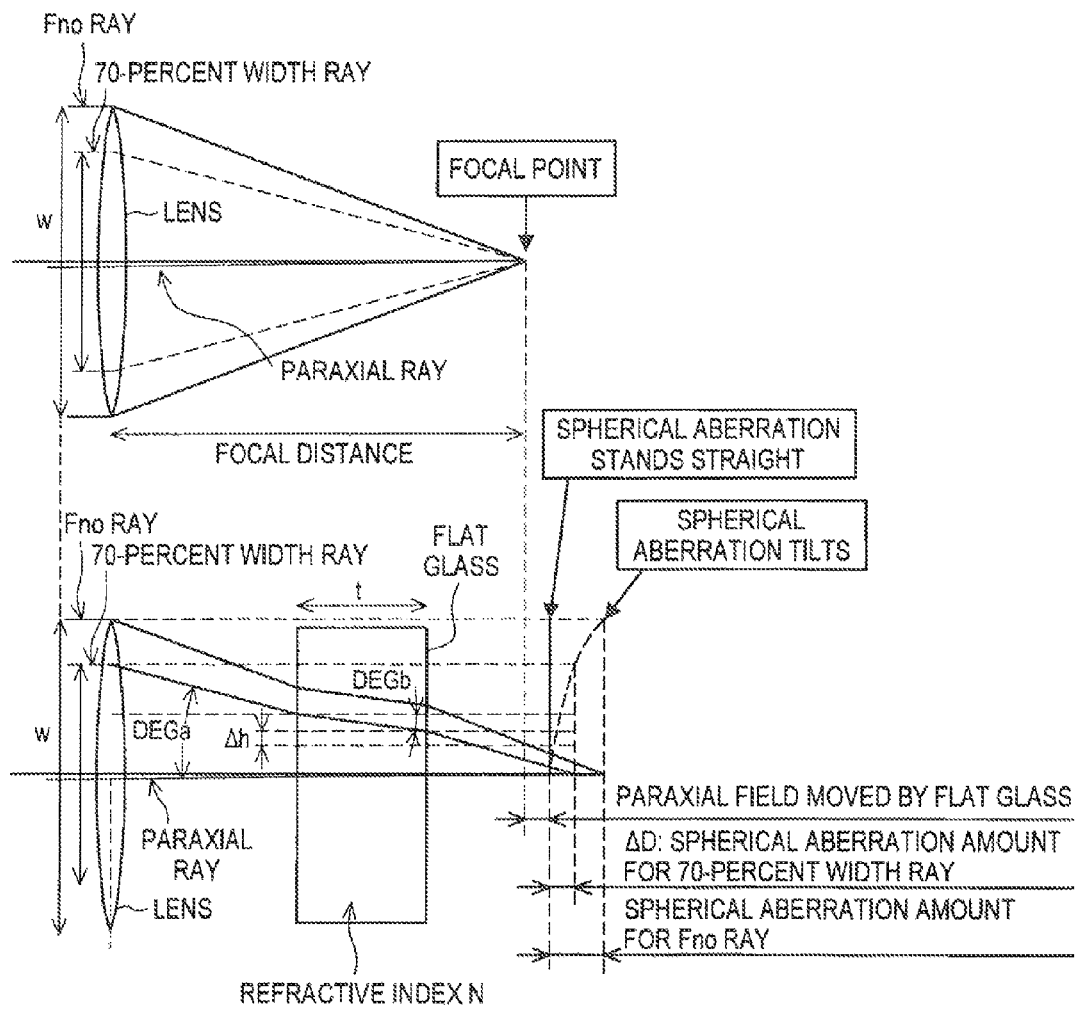
FIG. 3 is a view for explaining a spherical aberration amount calculating method according to an embodiment.

As illustrated in an upper part in FIG. 3, it is ideal that a paraxial ray is collected to one point on an optical axis by a lens. Because an original ray has little thickness in the paraxial ray, a tilt of the spherical aberration is hardly generated in the paraxial ray.

In the film camera, no substance, namely, air, is interposed in a contact portion A between the lens apparatus 100 and the imaging apparatus 200. Therefore, in the case that the lens apparatus 100 designed for the film camera is mounted on the film camera, no substance is inserted in the contact portion A between the lens apparatus 100 and the imaging apparatus 200. As illustrated in a lower part in FIG. 3, the spherical aberration stands straight, and the imaging system 10 is brought into focus. At this point, the spherical aberration does not vary, and it is not necessary that the flange-focal distance adjusting mechanism 250 make a correction.

However, in the case that the lens apparatus 100 designed for the film camera is mounted on the digital camera, the glass is inserted in the contact portion A between the lens apparatus 100 and the imaging apparatus 200. Therefore, as illustrated in the lower part in FIG. 3, the spherical aberration tilts backward. Because the spherical aberration further tilts backward with increasing thickness of the ray, the spherical aberration can be corrected by decreasing the thickness of the ray. At this point, it is necessary that the flange-focal distance adjusting mechanism 250 correct the position of the imaging element 230.

It has been found that when the diaphragm is opened, the sharpest image of the subject is shot while a ray (70-percent width ray) having a 70-percent width (height) to an F-number ray in the lower part in FIG. 3 is collected near a focal point to bring the imaging system into focus. When the diaphragm is narrowed, about 70 percent of the narrowed light quantity provides an indication of focusing. Therefore, it is necessary that the flange-focal distance adjusting mechanism 250 move the imaging element 230 backward and forward to bring the imaging system 10 into focus such that the 70-percent width ray of the F-number ray is obtained with respect to the spherical aberration variation.

Before the flange-focal distance adjustment, the camera controller 205 receives the F-number or T-number stored in the lens storage 145 through the communication unit 210 and the communication unit 150. The flange-focal distance adjusting mechanism 250 automatically corrects the position of the imaging element 230 using the received lens-side information.

Using the lens-side information, the camera controller 205 calculates the travel distance of the imaging element 230 according to the spherical aberration variation. Various constants necessary for the calculation and a program for calculating the aberration variation are stored in the camera storage 275. The camera controller 205 executes the pieces of data and the program to calculate the travel distance of the imaging element 230 using the lens-side information.

The calculation of the travel distance by the camera controller 205 will be described in detail. In the case of the lens for the film camera, when a field movement caused by the tilt of the spherical aberration of the lens apparatus 100 is corrected, on the side of the imaging apparatus 200, the flange-focal distance adjusting mechanism 250 is actuated by a field travel distance corresponding to the F-number, thereby correcting the focus position. Therefore, the F-number or the T-number is the minimum information that should be acquired as the lens-side information from the lens side. On the other hand, in the case of the lens for the digital camera, the correction is made by an amount of focusing deviation caused by a difference between a glass thickness in the digital camera and a glass thickness assumed on the lens side. Therefore, the information on a kind of filter, which includes the information on the glass thickness assumed on the lens side, is the minimum information that is necessary to be acquired as the lens-side information from the lens side.

(Calculation of Travel Distance of Imaging Element)

It is discussed that a cinema lens (a back-end glass is not considered) designed for the film camera is used. AD is an amount that moves the imaging element 230 in order to correct a phenomenon in which the position of the beast field moves according to the spherical aberration variation (see FIG. 3). A method for calculating the travel distance AD of the imaging element 230 will be described with reference to FIG. 3.

In the cinema lens, frequently, brightness of the lens is expressed by the T-number. A relationship between the T-number and the F-number is expressed as follows.

$T\text{-number} = F\text{-number}/\text{transmittance}$

It is discussed that the photographer sets the lens to an arbitrary T-number. Arc sine is expressed by $\text{SIN}^{-1}$, and arc tangent is expressed by $\text{TAN}^{-1}$. It is assumed that Tn is the T-number of the lens, Fn is the F-number of the lens, Tk (unit is %) is the transmittance of the lens, t is the thickness of the incorporated glass (flat glass in FIG. 3), and N is a refractive index of the incorporated glass.

The field travel distance AD (mm) can be obtained by the following calculation.

$Tn = F \div Tk \times 100$, and therefore $F = Tn \times Tk \div 100$

Because the F-number is calculated by ((focal distance of lens)÷(ray width W)), a ray incident angle can be expressed as a function of the F-number.

Assuming that the spherical aberration of the lens is sufficiently corrected, resolution becomes the best in the field that is defined by light flux in about 70 percent position of a light flux width. When the ray of the 70-percent width is incident to the flat glass, an angle DEGa formed with the optical axis is calculated by the following equation.

$DEGa = \text{TAN}^{-1}(1 \div F \times 0.7 \div 2)$

An angle DEGb at which the ray is transmitted through the flat glass is calculated by the following equation using the refractive index of the flat glass.

$DEGb = \text{SIN}^{-1}(1 \div N \times \text{SIN}(DEGa))$

An angle that is formed with the optical axis in going out from the flat glass returns to the original angle DEGa.

Assuming that Δh is a height difference between the ray, which is refracted during the incidence to the flat glass and passes through the rear surface of the flat glass, and the ray in which an extended line of the ray incident to the flat glass passes through the rear surface of the flat glass, Δh is calculated by the following equation.

$\Delta h = (\text{TAN}(DEGa) - \text{TAN}(DEGb)) \times t$

Therefore, the travel distance ΔD of the imaging element 230 is obtained as follows.

$\Delta D = \Delta h \div \text{TAN}(DEGa) - (t - t \div N)$

As described above, the camera controller 205 calculates the travel distance ΔD of the imaging element 230 to the spherical aberration amount in the 70-percent width ray. In the lens for the film camera, the flange-focal distance adjusting mechanism 250 is driven to move the imaging element 230 by the travel distance ΔD, which allows the field position to be corrected according to the amount of spherical aberration variation. In the lens for the digital camera, the information on the difference with the filter assumed on the lens side is input to the above equation to calculate the amount of spherical aberration variation, so that the correction may be made by the difference amount. In the case that filters information is not obtained from the lens side, the lens for the digital camera is regarded as the lens for the film camera to set the lens thickness to 0, and the travel distance ΔD may be calculated.

As described above, according to the imaging apparatus 200 of the embodiment, the automatic adjustment of the flange-focal distance to the lens-side spherical aberration variation can be implemented on the camera side by acquiring the lens-side information from the lens side. In the lens for the film camera, although the shooting distance information and the F-number were stored in the storage on the lens side in the past, the flange-focal distance was not adjusted on the camera side using the information acquired on the lens side.

In the embodiment, the flange-focal distance is adjusted with the flange-focal distance adjusting mechanism 250 provided on the camera side, and one of the advantages from the adjustment of the embodiment is that the sharp image of the subject can be taken using even the lens designed for the film camera. That is, according to the imaging apparatus 200 of the embodiment, even if the lens apparatus 100 designed for the film camera is used, the focus position is adjusted on the side of the imaging apparatus 200 in consideration of the lens value designed for the film camera. Therefore, the good shooting environment may immediately be provided to the photographer without feeling the trouble in that the adjustment is manually made by checking whether the lens is a lens designed for the film camera or the lens designed for the digital camera.

For example, in the case of the use of the lens for the film camera that is designed in the condition that the glass is not inserted in the camera, the flange-focal distance adjusting mechanism 250 in the camera moves the imaging element 230 by the deviation amount in which the best field is moved due to the spherical aberration generated by the filter in the camera. Therefore, the optimum image can be obtained according to the focus plane. In the case of the use of the lens for the digital camera, the flange-focal distance adjusting mechanism 250 moves the imaging element 230 by the amount of spherical aberration variation generated by the thickness difference between the insertion glass assumed on the lens side during the design and the glass in the camera actually used. Therefore, the optimum image can also be obtained according to the focus plane. In the case that the field position is corrected by the difference of the glass thickness, in the imaging system 10, an approximate correction can be made only by the optical path length correction without considering the spherical aberration correction, which allows the calculation amount to be decreased.

[3.2. Flange-Focal Distance Adjustment to Spherical Aberration Variation Caused by Lens Group Extension]

The flange-focal distance adjustment on the camera side will be described in consideration of not only [1] the above lens-side spherical aberration variation but also [2] the spherical aberration variation caused by the lens group extension.

The spherical aberration amount also varies by the extension of the lens group 110a during the short-range shooting. Generally, the spherical aberration varies when the shooting distance changes according to the focus adjustment of the lens. Therefore, the spherical aberration variation caused by the lens group extension may be corrected using the flange-focal distance adjusting mechanism 250 on the camera side.

The camera controller 205 corrects the position of the imaging element 230 to the spherical aberration variation caused by the lens group extension using information (spherical aberration information) on the spherical aberration variation, which is included in the lens-side information. Therefore, it is necessary for the camera controller 205 to acquire the spherical aberration information from the lens apparatus 100. As the method for calculating the travel distance AD of the imaging element 230 is described above, the description is omitted. Assuming that ΔD1 is the travel distance of the imaging element 230 according to [1] the lens-side spherical aberration variation and ΔD2 is the travel distance of the imaging element 230 according to [2] the spherical aberration variation caused by the extension of the lens group 110a, the final travel distance AD of the imaging element 230 becomes ΔD1−ΔD2.

The spherical aberration also varies in the case that the zooming is performed with the zoom lens in the lens group 110a. In this case, the spherical aberration information caused by the zooming is acquired from the side of the lens apparatus 100, and the travel distance of the imaging element 230 is calculated using the spherical aberration information, and the flange-focal distance may be adjusted.

In the case that the lens apparatus 100 has moderate performance, sometimes the spherical aberration is worsened by the camera-side flange-focal distance adjustment. In such cases, the position of the imaging element 230 can automatically be adjusted with the camera-side flange-focal distance adjusting mechanism 250.

As described above, according to the imaging apparatus 200 of the embodiment, by acquiring the spherical aberration information caused by the extension from the lens side, the automatic adjustment of the flange-focal distance can be implemented in consideration of the spherical aberration variation caused by the lens group extension. Therefore, the optimum image can be obtained. Particularly, in the case of the movie camera that is brought into focus by measuring the shooting distance with the tape scale or the like, the flange-focal distance adjustment of the embodiment is implemented after the manual focusing, which allows the focusing to be adjusted with high accuracy.

[3.3. Flange-Focal Distance Adjustment to Spherical Aberration Variation Caused by Component in Apparatus]

The flange-focal distance adjustment on the camera side will be described in consideration of not only [1] the lens-side spherical aberration variation and [2] the spherical aberration variation caused by the lens group extension but also [3] the spherical aberration variation caused by the exchange of the component assembled in the apparatus.

The spherical aberration also varies by the exchange of the component assembled in the apparatus, for example. The spherical aberration variation caused by the component exchange, or the like, may be corrected with the camera-side flange-focal distance adjusting mechanism 250.

The component information on the side of the imaging apparatus 200 is stored in the camera storage 275. The information on the component incorporated in the imaging apparatus 200 may be stored in the camera storage 275 during the assembly. In the case that the filter detector 155 detects the exchange of one of the components, the component information on the component of the post-exchange may be stored in the camera storage 275. The component information may include the information on the thicknesses of the several kinds of the filters assembled in the camera, the information on the physical property such as the refractive index relating to the component, and information being able to determine which kind of the filter is being used in the camera.

The camera controller 205 may make the correction according to the initial use of the imaging apparatus 200, the exchange of the component incorporated in the imaging apparatus 200, and switching of a setting mode of the imaging apparatus 200. Examples of the switching of the setting mode include the case that the setting of the resolution is switched, and the case that the variation in thickness of the component, such as the ND filter having several stages of density that is used in the camera while switched, and the lowpass filter are switched.

The flange-focal distance adjustment can be made on the camera side in consideration of the spherical aberration variation caused by the exchange of the component assembled in the lens apparatus 100, for example. In this case, the lens-side information on the component on the side of the lens apparatus 100 is stored as the component information in the lens storage 145. For example, the information on the component incorporated in the lens apparatus 100 during the assembly may be stored as one of the pieces of component information in the lens storage 145. In the case that the ND filter 135 is exchanged, the filter detector 155 may store the information on a kind of filter of the post-exchange in the lens storage 145 as one of the pieces of component information. The camera controller 205 may receive the lens-side information to make the correction according to the exchange of the lens apparatus 100, the exchange of the component incorporated in the lens apparatus 100, and the switching of the setting mode of the lens apparatus 100.

As described above, according to the imaging apparatus 200 of the embodiment, the flange-focal distance can be adjusted on the camera side in consideration of the spherical aberration variation caused by the exchange of the component assembled in the apparatus, for example. Therefore, in the field movement generated by the filter thickness or the difference of the refractive index, the change of the focus position can be eliminated even if the components having the different thicknesses are switched. For example, the paraxial field that is moved by inserting the flat glass is illustrated in the lower part in FIG. 3. According to the imaging apparatus 200 of the embodiment, the change of the focus position of the paraxial field can be eliminated. Even if the components having the different thicknesses are used while switched, the optimum image can be obtained every time the camera components are switched. Therefore, a degree of freedom can be enhanced in designing the camera. The flange-focal distance can be adjusted in consideration of the spherical aberration variation caused by difference between the ideal spherical aberration based on the information on the component assembled in the camera side or the lens side and the forming variation of the actual component. Therefore, a forming accuracy of the camera component can be set a little lower than that of those existing, and production cost can be reduced. Because a high-performance type camera such as a video picture camera has to have high adjustment accuracy on the order of several micrometers, the imaging apparatus 200 of the embodiment is particularly useful.

[3.4. Flange-Focal Distance Adjustment to Spherical Aberration Variation Caused by Temperature Change]

The flange-focal distance adjustment on the camera side will be described in consideration of, as described above, [1] the lens-side spherical aberration variation, [2] the spherical aberration variation caused by the lens group extension, and [3] the spherical aberration variation caused by the exchange of the component assembled in the apparatus, for example, and, in addition here, [4] the spherical aberration variation caused by the temperature change in the apparatus.

Sometimes temperatures at the lens apparatus 100 and imaging apparatus 200 vary by about 30 degrees Celsius. The focus position changes slightly by thermal expansion and thermal contraction of each component due to the temperature change. The spherical aberration variation caused by the temperature change may be corrected with the camera-side flange-focal distance adjusting mechanism 250.

In the case that the flange-focal distance is adjusted according to the temperature change on the side of the lens apparatus 100, it is necessary to receive the temperature information from the side of the lens apparatus 100. The lens-side temperature information is detected by the temperature sensor 160a attached to the lens apparatus 100, measured by the temperature measuring unit 160, and stored in the lens storage 145. The lens-side communication unit 150 transmits the temperature information, and the communication unit 210 receives the temperature information.

A conversion table that can convert a temperature variation into the spherical aberration variation is previously stored in the camera storage 275. Using the conversion table, the camera controller 205 calculates the travel distance of the imaging element 230 according to the temperature change. The flange-focal distance adjusting mechanism 250 moves the imaging element 230 according to the calculated travel distance.

In the case that the flange-focal distance is adjusted according to the temperature change on the side of the imaging apparatus 200, the camera-side temperature information is detected by the temperature sensor 285a attached to the imaging apparatus 200, measured by the temperature measuring unit 285, and stored in the camera storage 275. The camera controller 205 uses the temperature information stored in the camera storage 275. Using the conversion table, the camera controller 205 calculates the travel distance of the imaging element 230 according to the temperature change measured by the temperature measuring unit 285. The flange-focal distance adjusting mechanism 250 moves the imaging element 230 according to the calculated travel distance.

As described above, according to the imaging apparatus 200 of the embodiment, the position of the imaging element 230 is corrected based on the lens-side temperature information and the camera-side temperature information with respect to the spherical aberration variation caused by the temperature. Therefore, the focus position can be adjusted. Therefore, even if the environment changes largely during the shooting, the distance scale of the lens is exactly matched with the actual shooting distance, and the focus position can be adjusted based on the distance scale.

Presently, a material having a small thermal expansion coefficient is used as the camera component in order to suppress the spherical aberration variation caused by the temperature change as much as possible. Such a material having the small thermal expansion coefficient is expensive, and becomes a factor to increase cost of the imaging apparatus 200 as a whole. On the other hand, according to the imaging apparatus 200 of the embodiment, the position of the imaging element 230 is corrected according to the spherical aberration variation caused by the temperature change. Therefore, the necessity to use the expensive material having the small thermal expansion coefficient is decreased, the cost reduction of the component is achieved, and production cost can be reduced. Both or one of the temperature change of the lens apparatus 100 and the temperature change of the imaging apparatus 200 may be corrected.

It should be understood by those skilled in the art that various modifications, combinations, sub-combinations and alterations may occur depending on design requirements and other factors insofar as they are within the scope of the appended claims or the equivalents thereof.

For example, the automatic adjustment mechanism of the disclosure includes not only the mechanism that adjusts the flange-focal distance to the spherical aberration variation but also a mechanism that adjusts a back-focal distance. The flange-focal distance means the distance from the flange surface (a contact surface between the imaging apparatus 200 and the lens apparatus 100) to the focal point, and the back-focal distance means the distance from the last lens in the lens group to the focal point. Even if the back-focal distance adjusting mechanism is used, similarly to the flange-focal distance adjusting mechanism 250, the position of the imaging element 230 can automatically be adjusted using the lens-side information with respect to the spherical aberration variation.

In the embodiment, the flange-focal distance is adjusted on the camera side in consideration of the following factors.

[1] The lens-side spherical aberration variation,
[2] The spherical aberration variation caused by the lens group extension,
[3] The spherical aberration variation caused by the exchange of the component assembled in the apparatus, and
[4] The spherical aberration variation caused by the temperature change in the apparatus. The adjustments to the variations [1] to [4] hold as the imaging system of the disclosure even in the case that the adjustment is independently performed to each of the variations [1], [2], [3], and [4] and in the case that the adjustment is performed in any combination of the variations [1], [2], [3], and [4].

Additionally, the present technology may also be configured as below.

(1)

An imaging apparatus including:
an imaging element;
a communication unit that receives lens-side information from a lens apparatus;
an automatic adjustment mechanism that adjusts a position of the imaging element; and
a camera controller that controls the position of the imaging element, which is adjusted by the automatic adjustment mechanism according to a spherical aberration variation, based on the lens-side information.

(2)

The imaging apparatus according to (1), wherein the communication unit receives at least one of an F-number, a T-number, information on a kind of filter, and spherical aberration information as the lens-side information.

(3)

The imaging apparatus according to (1) or (2), wherein the communication unit receives spherical aberration information on extension of a lens incorporated in the lens apparatus, and the camera controller controls the position of the imaging element based on the spherical aberration information with respect to the spherical aberration variation caused by the extension of the lens, the position of the imaging element being adjusted by the automatic adjustment mechanism.

(4)

The imaging apparatus according to any one of (1) to (3), further including:

a storage in which information on a component assembled in the imaging apparatus is stored, wherein the camera controller controls the position of the imaging element based on the component information with respect to the spherical aberration variation caused by adjustment of the component, the position of the imaging element being adjusted by the automatic adjustment mechanism.

(5)

The imaging apparatus according to (4), wherein the camera controller causes the automatic adjustment mechanism to adjust the position of the imaging element in exchanging the component assembled in the imaging apparatus or switching a setting mode of the imaging apparatus.

(6)

The imaging apparatus according to any one of (1) to (5), wherein the communication unit receives information on a temperature detected by a temperature sensor attached to the lens apparatus, and the camera controller controls the position of the imaging element based on the temperature information with respect to the spherical aberration variation caused by the temperature, the position of the imaging element being adjusted by the automatic adjustment mechanism.

(7)

The imaging apparatus according to any one of (1) to (6), wherein the automatic adjustment mechanism includes a mechanism that automatically adjusts one of a flange-focal distance and a back-focal distance with respect to the spherical aberration variation.

(8)

An imaging system including:

a lens apparatus that includes a lens group; and an imaging apparatus that is detachably attached to the lens apparatus, wherein the lens apparatus includes a communication unit that transmits lens-side information, and the imaging apparatus includes:

an imaging element;

a communication unit that receives the lens-side information;

an automatic adjustment mechanism that adjusts a position of the imaging element; and a camera controller that controls the position of the imaging element, which is adjusted by the automatic adjustment mechanism according to a spherical aberration variation, based on the lens-side information.

The present disclosure contains subject matter related to that disclosed in Japanese Priority Patent Application JP 2011-086281 filed in the Japan Patent Office on Apr. 8, 2011, the entire content of which is hereby incorporated by reference.

What is claimed is:

1. An imaging apparatus comprising:

an imaging element;

a communication unit that receives lens-side information from a lens apparatus;

an automatic adjustment mechanism that adjusts a position of the imaging element; and a camera controller that controls the position of the imaging element, which is adjusted by the automatic adjustment mechanism according to a spherical aberration variation, based on the lens-side information, wherein the communication unit receives information on a temperature detected by a temperature sensor attached to the lens apparatus, and the camera controller controls the position of the imaging element based on the temperature information with respect to the spherical aberration variation caused by the temperature, the position of the imaging element being adjusted by the automatic adjustment mechanism.

2. The imaging apparatus according to claim 1, wherein the communication unit receives at least one of an F-number, a T-number, information on a kind of filter, and spherical aberration information as the lens-side information.

3. The imaging apparatus according to claim 1, wherein the communication unit receives spherical aberration information on extension of a lens incorporated in the lens apparatus, and the camera controller controls the position of the imaging element based on the spherical aberration information with respect to the spherical aberration variation caused by the extension or the lens, the position of the imaging element being adjusted by the automatic adjustment mechanism.

4. The imagine apparatus according to claim 1, further comprising:

a storage in which information on a component assembled in the imaging apparatus is stored;

wherein the camera controller controls the position of the imaging element based on the component information with respect to the spherical aberration variation caused by adjustment of the component, the position of the imaging element being adjusted by the automatic adjustment mechanism.

5. The imaging apparatus according to claim 4, wherein the camera controller causes the automatic adjustment mechanism to adjust the position of the imaging element in exchanging the component assembled in the imaging apparatus or switching a setting mode of the imaging apparatus.

6. The imaging apparatus according to claim 1, wherein the automatic adjustment mechanism includes a mechanism that automatically adjusts one of a flange-focal distance and a back-focal distance with respect to the spherical aberration variation.

7. An imaging system comprising:

a lens apparatus that includes a lens group; and an imaging apparatus that is detachably attached to the lens apparatus, wherein the lens apparatus includes a communication unit that transmits lens-side information, and the imaging apparatus includes:

an imaging element;
a communication unit that receives the lens-side information;
an automatic adjustment mechanism that adjusts a position of the imaging element; and
a camera controller that controls the position of the imaging element, which is adjusted by the automatic adjustment mechanism according to a spherical aberration variation, based on the lens-side information,
wherein the communication unit receives information on a temperature detected by a temperature sensor attached to the lens apparatus and
the camera controller controls the position of the imaging element based on the temperature information with respect to the spherical aberration variation caused by the temperature, the position of the imaging element being adjusted by the automatic adjustment mechanism.

* * * * *